United States Patent [19]

Niemela et al.

[11] Patent Number: 5,442,901
[45] Date of Patent: Aug. 22, 1995

[54] SELF-PROPELLED MOWER

[75] Inventors: Paul W. Niemela, Pickens; Hiroshi Morikawa, Clemson; Stephen M. Demarco, Greenville, all of S.C.

[73] Assignee: Ryobi North America, Easley, S.C.

[21] Appl. No.: 278,747

[22] Filed: Jul. 22, 1994

[51] Int. Cl.⁶ ............................................. A01D 34/68
[52] U.S. Cl. ........................................ 56/11.9; 56/17.5; 180/65.6
[58] Field of Search .................... 56/11.1, 11.4, 11.8, 56/11.9, 16.7, 17.5; 180/65.6; 318/39

[56] References Cited

U.S. PATENT DOCUMENTS

| | | | |
|---|---|---|---|
| 3,570,227 | 3/1971 | Bellinger | 56/11.9 X |
| 3,773,131 | 11/1973 | Jaulmes | 180/65.6 |
| 3,818,686 | 6/1974 | Haffner et al. | 56/11.1 |
| 3,853,197 | 12/1974 | Quiram | 180/19.1 |
| 3,874,151 | 4/1975 | Seifert et al. | 56/17.2 |
| 4,117,652 | 10/1978 | Jones et al. | 56/11.8 |
| 4,145,864 | 3/1979 | Brewster, Jr. | 56/10.2 R |
| 4,146,105 | 3/1979 | Scag | 180/373 |
| 4,214,641 | 7/1980 | Hauser | 180/19.1 |
| 4,905,463 | 3/1990 | Eilles | 56/17.2 |
| 5,163,273 | 11/1992 | Wojtkowski et al. | 56/11.9 |

Primary Examiner—David J. Bagnell
Attorney, Agent, or Firm—Brooks & Kushman

[57] ABSTRACT

A self-propelled, battery-powered lawn mower is provided having an onboard battery and two electric motors, a blade motor for rotating a grass cutting blade and a drive motor for propelling the lawn mower along a grass surface to be cut. The blade motor is provided with a switch for regulating the operation of the blade motor and the drive motor is provided with a speed control enabling the speed of the drive motor to be controlled independently of the speed of the blade motor.

13 Claims, 4 Drawing Sheets

SELF-PROPELLED MOWER

TECHNICAL FIELD

This invention relates to battery-powered lawn mowers and, more particularly, to self-propelled, battery-powered lawn mowers.

BACKGROUND ART

With the ever-increasing concern of air pollution, battery-powered lawn mowers are now becoming a viable alternative to conventional internal combustion engine-powered lawn mowers. With emission control legislation slated to go into effect in the late 1990's, the cost of gasoline-powered lawn mowers is expected to increase, making electric lawn mowers, and in particular, battery-powered lawn mowers, economically competitive.

A practical problem facing battery-powered lawn mowers is battery life. In order to satisfy a typical homeowner, a battery-powered lawn mower must be able to cut a quarter-acre of lawn on a single charge and preferably, the mower should be able to cut a half-acre of moderate length grass. In order to achieve adequate cutting time without resulting in unduly heavy and expensive batteries, it is important that the cutting blade and corresponding annular cutting chamber be designed to efficiently operate with minimum power consumption.

Initially, commercial battery-powered mowers were the type having a discharge chute for grass clippings. This was believed to be necessary to obtain desired cutting duration on a single charge. More recently, a battery-powered mulching lawn mower as illustrated in U.S. Pat. Nos. 5,299,414 and 5,301,494, which are incorporated by reference herein, were introduced incorporating a mulching mower blade and chamber. This mower, which was manufactured by the present applicant, is very similar to the disclosed inventions of the above-identified patents incorporated by reference; specifically, the description of the chassis, the cutting chamber, blade and battery charging circuit.

In spite of one's best efforts to minimize the size and weight of the battery required in order to achieve adequate run-time, a relatively heavy battery is required, making it more difficult to push, particularly in deep grass and in undulating terrain lawn areas.

SUMMARY OF THE INVENTION

An object of the present invention is to provide a self-propelled, battery-powered lawn mower.

Another object of the present invention is to provide a self-propelled lawn mower wherein the speed that the mower is propelled may be adjusted independently of the speed of the rotating cutting blade.

Yet another object of the present invention is to provide a lawn mower having a drive motor for assisting in propelling the lawn mower wherein the speed of the lawn mower can be varied dependent upon the push effort applied by the user.

Accordingly, the self-propelled lawn mower of the present invention is provided having a chassis having at least three wheels pivotably mounted thereon for positioning the chassis above the grass surface to be cut. An electric blade motor is mounted on the chassis having a rotary output operatively connected to a grass cutting blade which is rotated relative to the grass surface. An electric drive motor cooperates with the chassis and operatively drives at least one of the plurality of wheels to propel the chassis forward along the grass surface. An electric battery is mounted on the chassis fox supplying electric power to the blade motor and to the drive motor. A blade motor switch mechanism is provided for connecting and disconnecting the blade motor from the battery. A drive motor speed control is electrically interposed between the drive motor and the battery to regulate the drive motor speed independently of the speed of the blade motor.

Preferably, the drive motor is of a fractional horsepower permanent magnet DC type having a rotational speed which varies significantly with the function of applied torque. The speed of the drive motor and resulting speed of propulsion of the lawn mower varies the function of the push effort of the operator, thereby reducing the push force to an acceptable comfort level while minimizing the drive motor energy requirements and the resulting decrease in run-time on a single battery charge.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

BEST MODE FOR CARRYING OUT THE INVENTION

Figure 1:
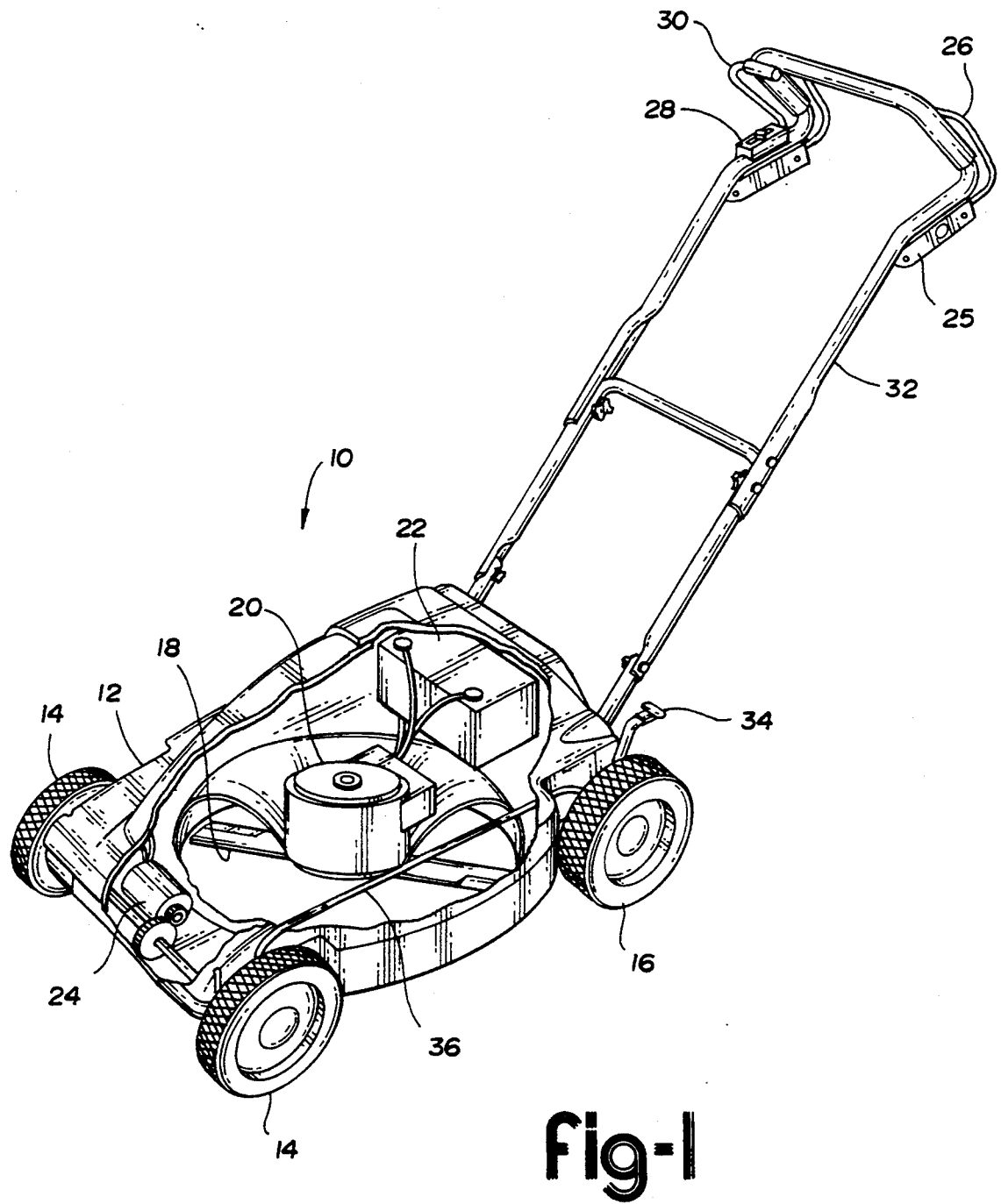
FIG. 1 is a perspective view of a self-propelled lawn mower incorporating the present invention.

Referring to FIG. 1, a self-propelled lawn mower 10 is provided. The lawn mower is made up of the chassis 12 having a pair of front wheels 14 and a pair of rear wheels 16 (right rear wheel hidden from view). A rotary cutting blade 18 is affixed to an output shaft of electric blade motor 20 for rotating cutting blade 18 within an annular cutting chamber. In the embodiment illustrated, the lawn mower 10 is of the mulching type, however, it should be appreciated that a non-mulching mower such as a mower having a discharge chute for grass clippings can alternatively be used.

Battery 22 is mounted on chassis 12 as illustrated. Battery 22 in the preferred embodiment, is of the lead acid type, however, other battery types can be used. Battery 22 provides power to blade motor 20 and drive motor 24. Drive motor 24 is operatively connected to the front wheels 14 in order to propel the lawn mower forward.

The operation of blade motor 20 is controlled by a blade motor switch 25 connected to bail bar 26. The operation of the drive motor 24 is regulated by a drive motor speed control 28 and drive motor switch 30. By adjusting drive motor speed control 28, the user of the mower can control the speed of the drive motor 24 independently of the blade motor 20.

Figure 5:
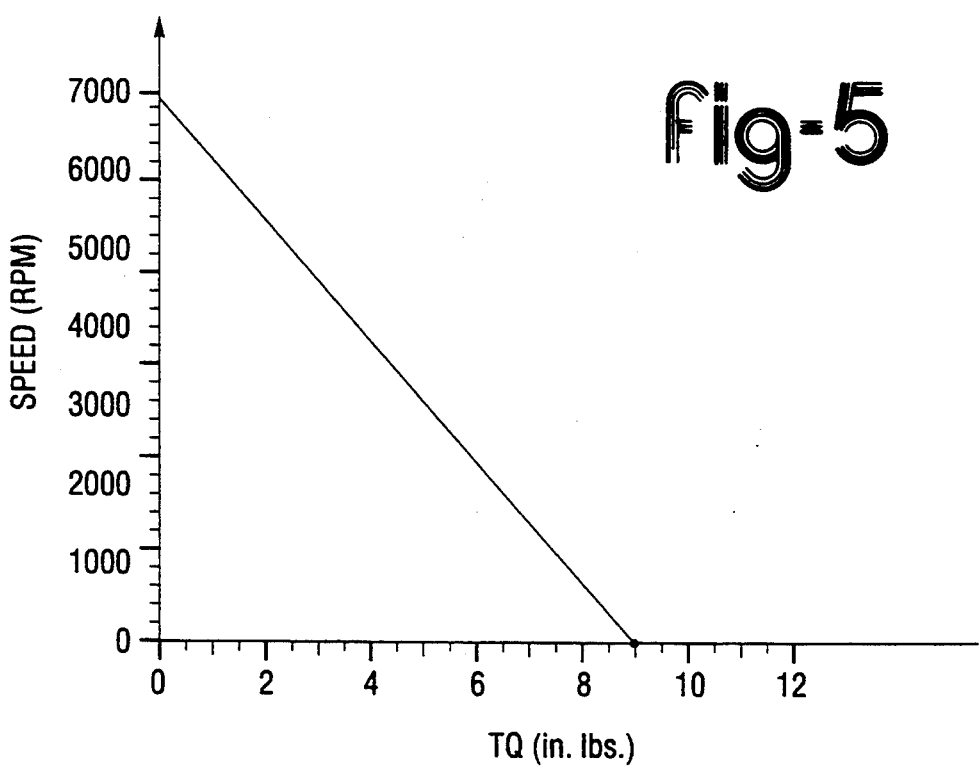
FIG. 5 is a speed versus torque curve for the drive motor.

Preferably, the speed control 28 will be set so that the drive motor 24 is under-powered. Drive motor 24 has relatively straight output speed versus torque curve as shown in FIG. 5. As a result, drive motor 24 can be used to assist in propelling the lawn mower. Energy consumption by the drive motor is reduced by the push force exerted by the lawn mower user on handle 32.

In operation, the user can vary the lawn mower speed slightly by varying the push effort on handle 32, giving the user improved control over the mower while maintaining push force within an acceptable comfort level. The degree of propulsion assist provided by drive motor 24 is determined by drive speed control 28 which varies the amount of electrical energy supplied to drive motor 24. Drive motor speed control 28 is a conventional DC motor pulse width modulation speed control of the type used in portable battery powered electric tools. Pulse width modulation circuits of this type are commercially available from a number of sources including Lucerne Products Inc., 7600 Olde Eight Road, Hudson, Ohio, 44236. Pulse width modulation circuits are generally described in "The Electrical Engineering Handbook", CRC Press, 1992 pages 712-716, which is incorporated by reference herein.

In the preferred embodiment, drive motor 24 is a permanent ceramic magnet DC motor while allowing for 24 volt operation. Drive motor 24 has a free speed of 6,000 to 7,000 rpm and a stall torque of 8 to 10 inch pounds. Preferably, the maximum horsepower output of drive motor 24 is less than 0.5 horsepower and most preferably, drive motor output is in the 0.2 to 0.3 horsepower range.

The electric drive motor 24 is supported on chassis 12 and is provided with a rotary output which is operatively connected to the front wheel via a drivetrain having an approximate 40:1 ratio, i.e. 40 turns of the drive motor results in 1 revolution of the front wheels.

The drivetrain operatively connecting the driven front wheels must be able to accommodate wheel height adjustment to enable the lawn mower user to vary the grass cutting height. In the embodiment illustrated in FIG. 1, a single point height adjustment lever 34 is provided to enable the operator by moving a single lever to simultaneously vary the position of all four wheels relative to chassis 12. Height adjustment link 36 positions the front left wheel 14. A similar height adjustment link is provided on the right side of the mower for positioning the front right wheel 14.

Figure 2:
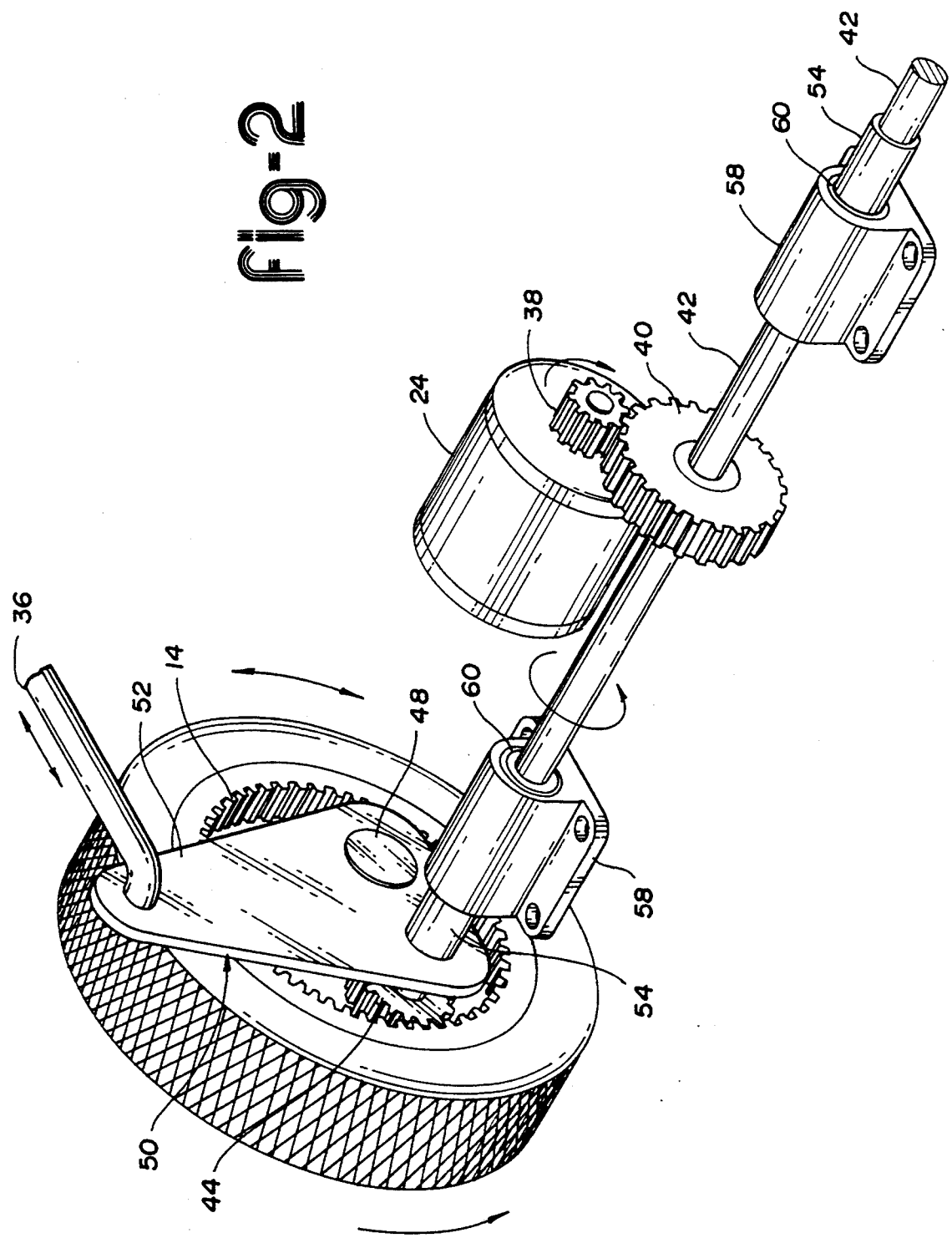
FIG. 2 is an enlarged partial perspective view of the drive system.
Figure 3:
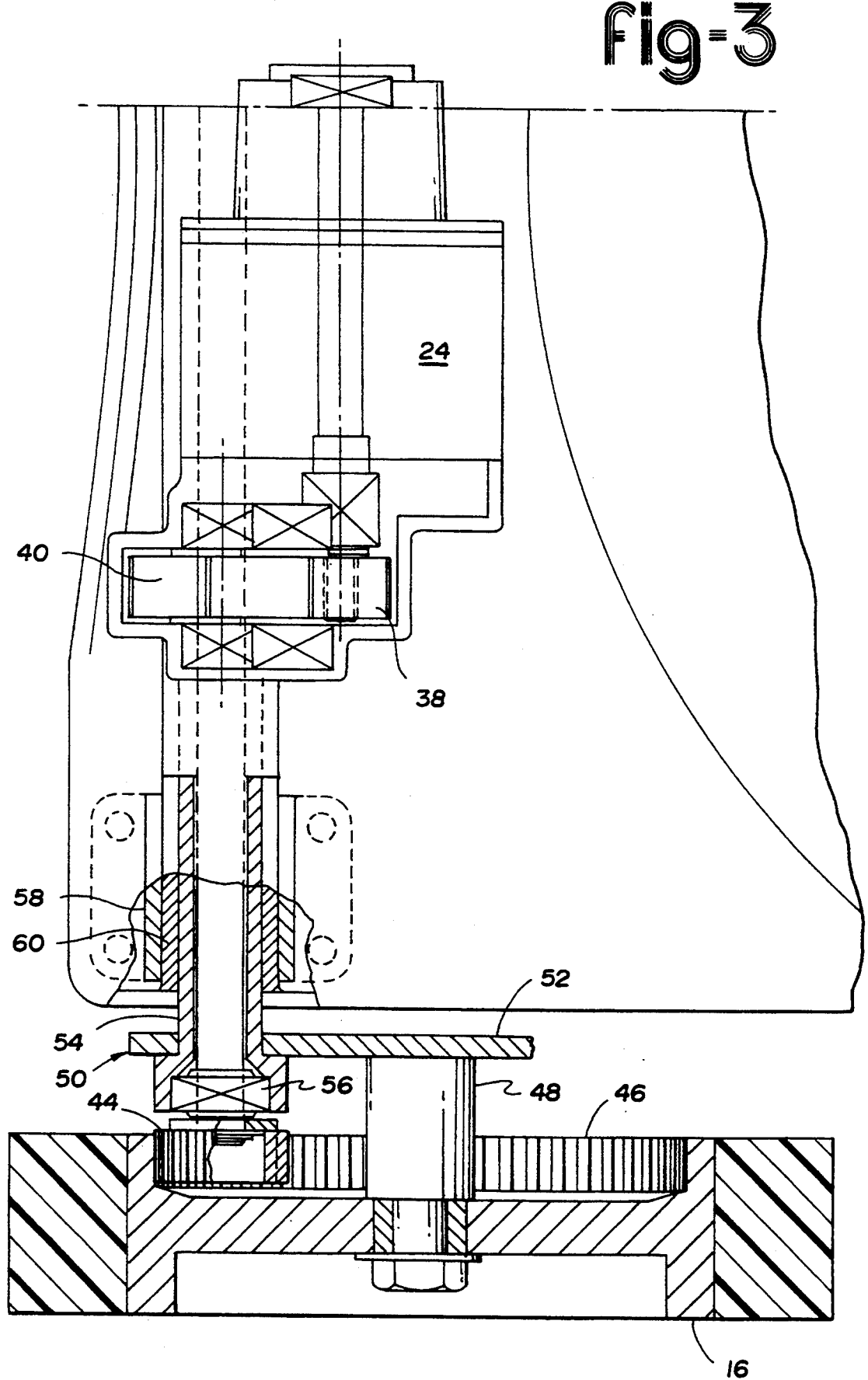
FIG. 3 is a top plan view of the drive motor and drive system.

With reference to FIGS. 2 and 3 of the drawings, the height adjustment mechanism and the motor drivetrain can be seen in more detail. Drive motor 24 is provided with a drive motor gear 38 which drives driveshaft input gear 40 mounted on driveshaft 42. Driveshaft 42 extends transversely relative to the lawn mower chassis and is provided with a right and left end and a central region therebetween. The right and left end of driveshaft 42 are each provided with a drive pinion 44. Drive pinion 44 cooperates with an internal ring gear 46 on front wheel 14. Wheel 14 is freely pivotably mounted on a stub axle 48 and, as shown, the axis of stub axle 48 is rearwardly set from the axis of driveshaft 42. Stub axle 48 is part of trailing arm assembly 50.

Trailing arm assembly 50 is made up of stub axle 48, trailing arm plate 52, and sleeve 54. Driveshaft 42 extends through sleeve 54 and is pivotably connected thereto via a bearing 56, shown in FIG. 3. Sleeve 54 is pivotably mounted to chassis 12 via clamp 58 and rotary bushing 60 which allows the trailing arm assembly to rotate relative to chassis 12. Height adjustment link 36 pivotably connects to trailing arm plate 52. Fore and aft movement of the height adjustment link 36 causes the stub axle to move along an arcuate path raising and lowering the wheel 14 accordingly. Trailing arm assembly 50 pivots about the transverse axis of driveshaft 42 enabling the height of the wheels to be adjusted without affecting the engagement of drive pinion 44 and internal ring gear 46.

In the preferred embodiment, as previously noted, a final drive ratio of approximately 40:1 is provided. To achieve this drive ratio, drive motor gear 38 is provided with 7 teeth, driveshaft input gear 40 is provided with 48 teeth, drive pinion 44 has 9 teeth, and internal ring gear 46 has 52 teeth. Of course, it should be appreciated that different drive ratios may be utilized depending upon wheel diameter and motor speed. It should be also appreciated that a simple two gear pair of drive motor gears 38 and driveshaft input 40 can be replaced by a multiple gear train. Internal ring gear 46 can be replaced by an external gear formed on the inner hub of wheel 14. These and other variations in the drivetrain including using a chain and sprocket or a pulley and belt system fall with in the scope of the present invention and serve as a means for transmitting power from the drive motor to the driven wheels.

Figure 4:
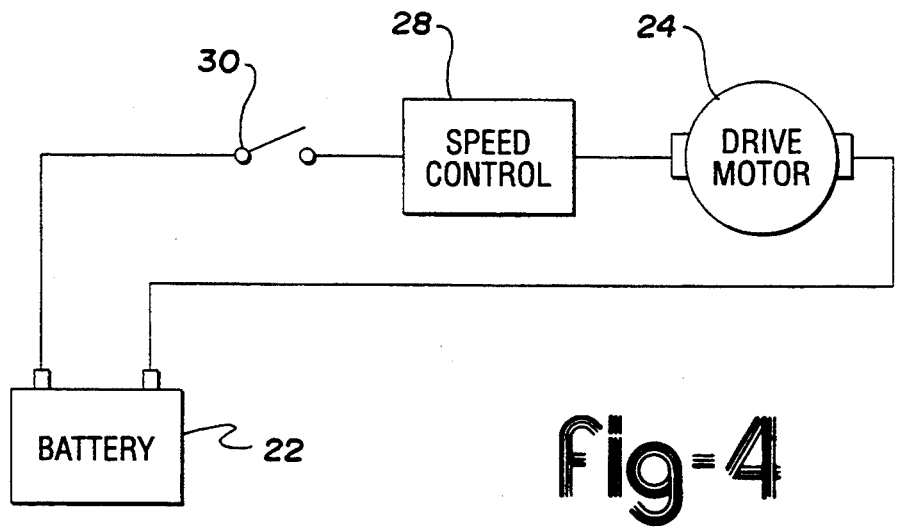
FIG. 4 is a schematic illustration of the drive motor circuit.

In the preferred embodiment, drive motor 14 is operatively connected by the battery in the manner shown in the FIG. 4 schematic. Switch 30 is connected in series with speed control 28 and drive motor 24. It should be appreciated that the speed control regulates the amount of energy to the motor and the actual motor speed will be determined by the power supplied to the motor as well as the load. At a given speed control setting, motor speed can vary depending upon the amount of force the user applies to the handle to push the mower and the amount of variation and resistance resulting from changing grass height or terrain.

It should be appreciated that the electrical schematic could be altered so that a single switch can supply power to both the drive motor and the blade motor. The speed of the drive motor and the blade motor can be independently controlled by drive motor speed control 28. By facilitating the independent control of drive motor 24, the blade may be rotated at the optimum cutting speed from an efficiency standpoint and the drive motor can enable the user to select the desired walking speed and amount of propulsion assistance the drive motor provides, thereby improving the lawn mower responsiveness while minimizing drive motor power requirements.

While the best mode for carrying out the invention has been described in detail, those familiar with the art to which this invention relates will recognize various alternative designs and embodiments for practicing the invention as defined by the following claims.

What is claimed is:

1. A lawn mower comprising:
   a chassis;
   at least three wheels pivotably cooperating with the chassis for positioning the chassis above a grass surface to be cut;
   a grass cutting blade;
   an electric blade motor mounted on the chassis having a rotary output operatively connected to the grass cutting blade to rotate the blade relative to the grass surface to be cut;

an electric drive motor cooperating with the chassis and operatively connected to at least one of said wheels to propel the chassis along the grass surface;

an electric battery mounted on the chassis for supplying electric power to the blade motor and the drive motor;

a blade motor switch electrically interposed between the battery and the blade motor for regulating the operation of the blade motor; and a drive motor control electrically interposed between the drive motor and the battery to regulate the operation of the drive motor independently from the operation of the blade motor;

said at least three wheels comprise a pair of front wheels mounted on a forward portion of the chassis and a pair of rear wheels mounted on a rearward portion of the chassis wherein said drive motor is operatively connected to said pair of front wheels.

2. The lawn mower of claim 1 further comprising a transverse driveshaft having a right and left end and a central portion therebetween, the driveshaft right and left ends cooperating with the pair of front wheels and the driveshaft central portion cooperating with the drive motor.

3. The lawn mower of claim 2 further comprising a pair of trailing arms pivotably connected to the chassis and rotatable about the transverse driveshaft, the pair of trailing arms pivotably supporting the pair of front wheels rotatable about a wheel axis spaced from the transverse driveshaft so that rotation of the trailing arms causes the height of the chassis and cutting blade to be varied relative to the grass surface to be cut.

4. The lawn mower of claim 3 wherein the driveshaft is provided with a right and left drive pinion and said front wheels are each provided with a driven gear cooperating with one of said drive pinions.

5. The lawn mower of claim 4 wherein the driven gears in each of the front wheels is an internal ring gear.

6. The lawn mower of claim 1 wherein said electric blade motor rotary output is oriented along a generally vertical axis and said grass cutting blade is affixed directly thereto for rotation within a generally horizontal cutting plane.

7. A lawn mower comprising:
a chassis defining an annular cutting chamber;
a pair of front wheels pivotably mounted on a forward portion of the chassis and a pair of rear wheels pivotably mounted on a rearward portion of the chassis for positioning the chassis above a grass surface to be cut;
a rotary grass cutting blade for rotation within the chassis annular chamber;
an electric blade motor mounted on the chassis having a rotary output shaft extending generally vertically and centrally oriented relative to the chassis annular chamber and operatively connected to the grass cutting blade to rotate the blade relative to the grass surface to be cut;
an electric drive motor cooperating with the chassis and operatively connected to the pair of front wheels to assist the user in propelling the chassis along the grass surface;

an electric battery mounted on the chassis for supplying power to the blade motor and the drive motor;
a blade motor switch electrically interposed between the battery and the blade motor for regulating the operation of the blade motor; and
a drive motor control interposed between the drive motor and the battery to regulate the operation of the drive motor independent of the speed of the blade motor.

8. The lawn mower of claim 7 wherein said drive motor comprises a permanent magnet DC motor having a maximum output of less than 0.5 horsepower.

9. The lawn mower of claim 8 wherein said drive motor has a maximum horsepower output in the 0.2 to 0.3 horsepower range.

10. The lawn mower of claim 7 wherein the drive motor has a relatively straight torque versus speed curve enabling the user to push the lawn mower at different speeds by varying the amount of push effort.

11. A battery powered lawn mower comprising:
a chassis;
a handle attached to the chassis which may be pushed by a user to steer and partially propel the lawn mower;
at least three wheels pivotably cooperating with the chassis for positioning the chassis above a grass surface to be cut;
a grass cutting blade;
an electric blade motor mounted on the chassis having a rotary output operatively connected to the grass cutting blade to rotate the blade relative to the grass surface to be cut;
an electric drive motor cooperating with the chassis and operatively connected to at least one of said wheels to assist in propelling the chassis along the grass surface wherein the speed at which the chassis is propelled varies as a function of the push effort exerted by the user on the handle;
an electric battery mounted on the chassis for supplying electric power to the blade motor and the drive motor; a blade motor switch electrically interposed between the battery and the blade motor for regulating the operation of the blade motor; and
a drive motor control electrically interposed between the drive motor and the battery to regulate the output torque of the drive motor independently from the operation of the blade motor enabling the speed at which the chassis is propelled to be determined by the sum of the drive motor torque and the user's push effort wherein the user's push effort conserves battery energy and enhances user control of the lawn mower.

12. The lawn mower of claim 11 wherein:
the speed of the electric drive motor is generally linearly inversely proportional to the output torque of the electric drive motor enabling the user to vary the speed at which the chassis is propelled by varying push effort.

13. The lawn mower of claim 11 wherein:
said at least three wheels comprise a pair of front wheels mounted on a forward portion of the chassis and a pair of rear wheels mounted on a rearward portion of the chassis wherein said drive motor is operatively connected to said pair of front wheels.

* * * * *

UNITED STATES PATENT AND TRADEMARK OFFICE
CERTIFICATE OF CORRECTION

PATENT NO. :  5,442,901

DATED :  August 22, 1995

INVENTOR(S) :  Niemela, et al.

It is certified that error appears in the above-identified patent and that said Letters Patent is hereby corrected as shown below:

Column 2, Line 3
(Application Page 3, Line 14):

Delete "fox" and, insert -- for --.

Column 2, Lines 28-29
(Application Page 4, Line 6):

Delete "Best Mode For Carrying Out The Invention" and insert -- Brief Description of the Drawings --.

Column 2, Line 56
(Application Page 5, Line 5):

After "22" insert -- , -- (comma).

Column 3, Line 23
(Application Page 6, Line 11):

After "1992" insert -- , -- (comma).

UNITED STATES PATENT AND TRADEMARK OFFICE
CERTIFICATE OF CORRECTION

PATENT NO. : 5,442,901
DATED : August 22, 1995
INVENTOR(S) : Niemela, et al.

It is certified that error appears in the above-indentified patent and that said Letters Patent is hereby corrected as shown below:

Column 6, Line 41, Claim 11

Page 2, Line 34, Claim 12):

After "motor" begin a new paragraph.

Signed and Sealed this

Ninth Day of January, 1996

Attest:

BRUCE LEHMAN

*Attesting Officer*  *Commissioner of Patents and Trademarks*